(12) United States Patent
Asmatulu et al.

(10) Patent No.: US 9,776,107 B1
(45) Date of Patent: Oct. 3, 2017

(54) SYSTEM AND METHOD FOR RECYCLING OF PRE-IMPREGNATED COMPOSITE FIBERS

(71) Applicant: WICHITA STATE UNIVERSITY, Wichita, KS (US)

(72) Inventors: Ramazan Asmatulu, Wichita, KS (US); Vamsidhar Patlolla, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 0 days.

(21) Appl. No.: 15/183,821

(22) Filed: Jun. 16, 2016

(51) Int. Cl.
*B01D 21/28* (2006.01)
*B29B 17/02* (2006.01)
*B01D 21/30* (2006.01)

(52) U.S. Cl.
CPC ......... *B01D 21/283* (2013.01); *B01D 21/302* (2013.01); *B29B 17/02* (2013.01); *B29B 2017/0227* (2013.01); *B29B 2017/0293* (2013.01)

(58) Field of Classification Search
CPC ............................ B01D 21/283; B01D 21/302
See application file for complete search history.

(56) References Cited

U.S. PATENT DOCUMENTS

| | | | |
|---|---|---|---|
| 6,090,213 A * | 7/2000 | Moyers | B08B 3/12 134/1 |
| 6,537,341 B2 | 3/2003 | Dannenhauer et al. | |
| 8,420,702 B2 | 4/2013 | Van Weynbergh et al. | |
| 2008/0031094 A1* | 2/2008 | Laugharn | B01F 11/0283 367/138 |
| 2008/0081877 A1* | 4/2008 | Liu | C08F 6/02 525/191 |
| 2014/0283348 A1 | 9/2014 | Asmatulu | |
| 2015/0344686 A1* | 12/2015 | Shimizu | C08J 5/24 523/468 |

* cited by examiner

*Primary Examiner* — James Sanders
(74) *Attorney, Agent, or Firm* — McNair Law Firm, P.A.

(57) ABSTRACT

An apparatus for recycling of fibers pre-impregnated with resin may include a container configured to receive a predetermined amount of solvent and a predetermined amount of fibers pre-impregnated with resin. The apparatus may also include an energy source configured to provide sound energy into the container in order to facilitate the removal of resin from the fibers, and a controller configured to control a frequency of the sound energy provided by the energy source into the container.

15 Claims, 7 Drawing Sheets

SYSTEM AND METHOD FOR RECYCLING OF PRE-IMPREGNATED COMPOSITE FIBERS

TECHNICAL FIELD

Example embodiments generally relate to composite fibers, and more particularly, relate to the recycling of pre-impregnated composite fibers.

BACKGROUND

Pre-impregnated composite fibers are expensive fibers because of the raw materials used and the process parameters involved in the manufacturing of the fibers. Generally, during the manufacturing of parts or objects from pre-impregnated composite fibers, a significant amount of cut-off waste is generated. The cut-off waste is typically disposed in landfills, thereby wasting a portion of the expensive fibers and contributing to environmental concerns associated with dumping waste in landfills.

BRIEF SUMMARY OF SOME EXAMPLES

An example embodiment may provide an apparatus for recycling of fibers pre-impregnated with resin. The apparatus may include a container configured to receive a predetermined amount of solvent and a predetermined amount of fibers pre-impregnated with resin. The apparatus may also include an energy source configured to provide sound energy or agitation energy into the container in order to facilitate the removal of resin from the fibers, and a controller configured to control a frequency of the sound energy provided by the energy source into the container.

In an example embodiment, a method for recycling of fibers pre-impregnated with resin may be provided. The method may include providing a predetermined amount of solvent in a container, and providing a predetermined amount of fibers pre-impregnated with resin in the container. The method may also include providing sound energy into the container via an energy source of the container in order to facilitate the removal of the resin from the fibers, and controlling a frequency of the sound energy provided by the energy source into the container via a controller of the container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
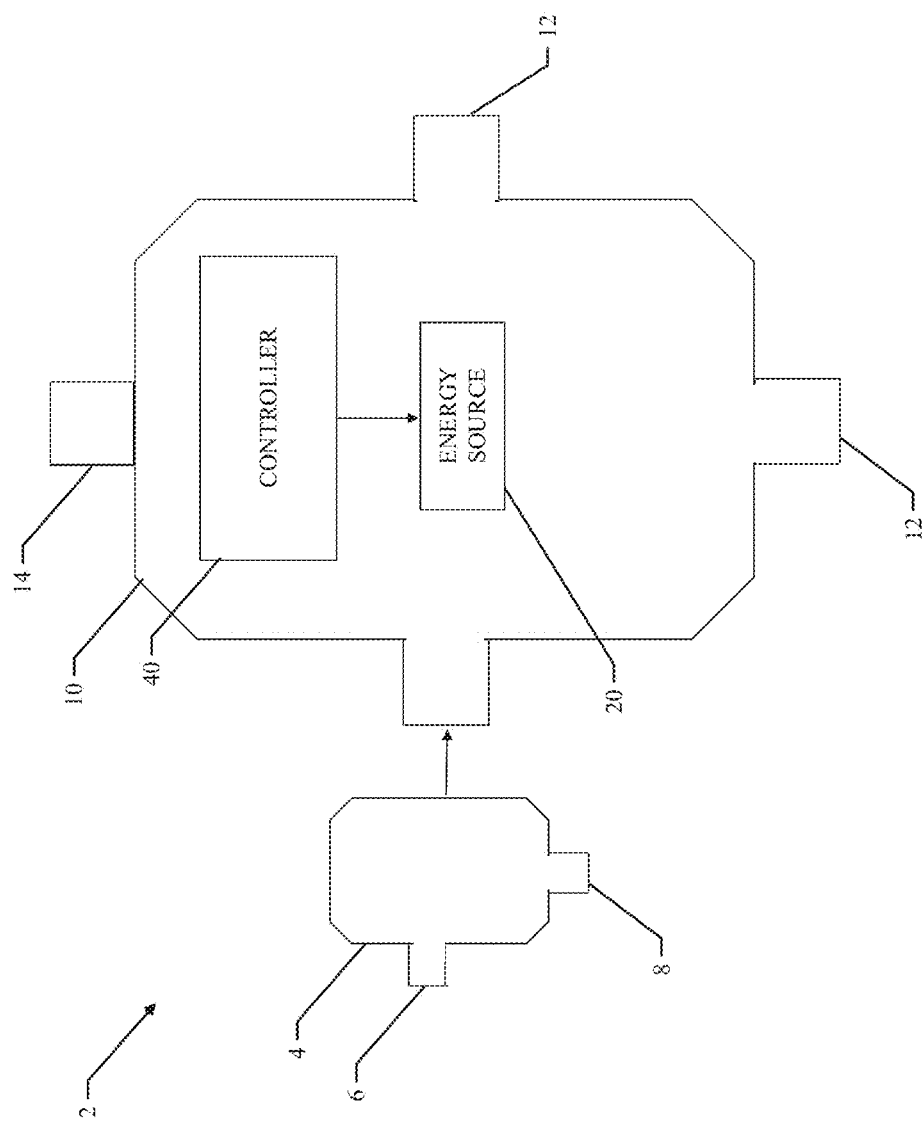
FIG. 1 illustrates a pre-impregnated fiber recycling system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments disclosed herein may allow for the recovery of the expensive fibers, and the resins of which the fibers are impregnated with, for reuse in other applications. In particular, by being able to reuse the fibers and the resin, the waste associated with the fibers will be minimized thereby maximizing the use of the fibers and lessening the fibers impact on environmental considerations. Moreover, the recycled fibers and resins may be made available for other applications at more affordable prices.

FIG. 1 illustrates a block diagram of a pre-impregnated fiber recycling system 2 according to an example embodiment. The pre-impregnated fiber recycling system 2 may include at least one container 4 for receiving composite fibers pre-impregnated with resin. The fibers may take the form of a weave or may be unidirectional fibers. Moreover, the fibers may contain a predetermined amount of resin in order to bond the fibers together and to other components. In some cases, the resin may be only partially-cured to allow for easier handling (i.e., B-Stage material) and must be stored in a cold environment in order to prevent partial or complete curing of the resin.

As shown in FIG. 1, the container 4 may include an inlet 6 and an outlet 8. The container 4, via the inlet 6, may receive a predetermined amount of solvent. In some cases, the container 4 may be formed from solvent-resistant materials such as stainless steel, glass, polytetrafluoroethylene, or any other solvent resistant materials. The solvent may be an organic solvent such as dimethylformamide, N,N-dimethylacetamide, acetone, toluene, acetonitrile, hexane, tetrahydrofuran, or the like. The solvent type and the amount of solvent loaded into the container 4 may be based on a number of factors, such as the type of resins contained in the fibers, the weight of fibers to be loaded into the container 4, the approximate amount of resin contained within the fibers, etc.

Once the predetermined amount of solvent has been loaded into the container 4, a predetermined amount of fibers pre-impregnated with resins may then be received into the container 4 via the inlet 6. In some cases, the fibers may be received into the inlet 6 of the container 4 via rollers or the like. The fibers loaded through the inlet 6 may be a variety of shapes and sizes and may contain several different resin systems. The amount of fibers loaded into the tank, or in some cases, the selection of fibers based on the type of resins contained therein, may also be based on a number of factors such as the type of solvent used, the amount of solvent used, the amount of resin contained within the fibers, container temperature, and pressure, etc. It should be understood that a group of fibers containing more than one type of resin system may be simultaneously loaded into the container for application of the sonication or agitation process described herein. Moreover, the type of solvent used within the container, the amount of solvent used within the container, or the amount of fibers placed within the container may be adjustable via an operator. Therefore, each solvent-fiber mixture placed into the container 4 may be different.

In some cases, the container 4 may be an ultrasonicator or agitator. However, in other example embodiments, as shown in FIG. 1, once the solvent and fibers have been mixed in the container 4, the fiber-solvent mixture may be transferred to a separate ultrasonicator 10. According to example embodiments contained herein, the ultrasonicator 10 may have specific environments under which it operates (e.g., low or high frequency only). However, in some cases, the ultrasonicator 10 may be configured to operate in different environments (e.g., high and low frequency) based on manual or automatic control. It should be understood that the ultrasonicator 10 is a vessel in which the sonication process is applied. Sonication is the process of applying sound energy to agitate the solution contained within the vessel. The sonication process initiates and improves the process of resin removal from the fibers and makes the resin available for biofuel production and the fibers available for other applications. In some cases, the sound waves propagate through a liquid medium (e.g., the solvent) resulting in alternating high pressure and low pressure cycles thereby creating very high local temperatures and shear forces to remove the resin from the fibers.

As shown in FIG. 1, the ultrasonicator 10 may include an interface panel 14. The interface panel 14 may be the mechanism by which instructions are provided to a controller 40 to control the pressure, frequency, agitation, or temperature in the ultrasonicator 10, as described herein, and the mechanism by which feedback is provided to the operator regarding the sonication process status, options, and/or the like. In this regard, the interface panel 14 may be a graphical user interface (GUI) that is easily programmed by the operator. In an example embodiment, the interface panel 14 may include a touch screen display capable of providing visual indications to the operator and further capable of receiving touch inputs from the operator. In certain example embodiments, the interface panel 14 may include a simple interface of buttons, lights, dials and/or the like. In further examples, the operator may remotely control the interface panel 14 from a mobile electronic device including, but not limited to, a smartphone, a tablet, a laptop and/or the like.

Moreover, the ultrasonicator 10 may include an energy source 20 by which sound energy in a range from 1 Hz to 100 GHz may be applied to the fiber-solvent mixture. Typically, the sound energy may be applied by the energy source 20 for time periods ranging from one second to sixty minutes. In some example embodiments, the energy source 20 may be controlled, either directly or indirectly, by the controller 40. The controller 40 may include processing circuitry (e.g., a processor and memory) configured to store instructions and execute the same in order to control the sonication process. Thus, for example, the controller 40 may be understood to execute one or more algorithms defining the sonication process for the ultrasonicator 10. Consequently, example embodiments provide the ability to create unique sonication "strategies" or "techniques" based upon the relationship of time, given frequencies, and other environmental parameters (e.g., manual agitation, pressure, or temperature). As described herein, the controller 40 may be configured to execute algorithms that control the different aspects associated with the application of the sonication process to the fiber-solvent mixture.

The controller 40 may be configured to receive inputs descriptive of the type of solvent, the volume of solvent, the volume of fibers, or the type of resin systems contained within the fibers (e.g., via the interface panel 14) in order to provide instructions or controls to the energy source 20 to control the sonication process. In an example embodiment, the controller 40 may be configured to access data tables used to drive the energy source 20 to generate sound energy at corresponding levels or frequencies for corresponding times determined by the data tables based on initial condition information descriptive of the solvent-fiber mixture. The data tables may also define specific frequencies to apply at corresponding different times or in different sequences. In some cases, the data tables may define a specific time interval, sequence, frequency, or the like for specific fibers, resins, or fiber/resin combinations.

In particular, the controller 40 may be configured to execute various programs in order to ensure that substantially all the resin is effectively removed from the fibers. It should be understood that if the various programs that facilitate the sonication process are successful, the ultrasonicator 10 may contain fibers that have substantially no resin and a solvent-resin mixture. Accordingly, the controller 40 may execute a single frequency program, a multiple frequency program, or a simultaneous frequency program in order to execute the sonication process, or in other words, to facilitate resin removal from the fibers.

In the single frequency program, the controller 40 may be configured to direct the energy source 20 to apply a first frequency for a first predetermined period of time in the ultrasonicator 10. For example, the controller 40 may direct the energy source 20 to apply a frequency of up to 100 GHz for three seconds. In some other cases for example, the controller 40 may direct the energy source to apply a frequency of 10 Hz for sixty minutes. Other examples of the application of single frequencies for various given times are also possible.

In the multiple frequency program, the controller 40 may be configured to direct the energy source 20 to apply a first frequency for a first predetermined period of time and then to apply a second frequency for a second predetermined period of time. In most cases, the first and second frequencies are different. Moreover, in some cases, the first frequency may be defined as a low frequency, and the second frequency may be defined as high frequency, or vice versa. For example, the controller 40 may direct the energy source 20 to apply a frequency of 60 kHz for one minute and then direct the ultrasonicator to operate at 1 GHz for fifteen seconds.

In the simultaneous frequency program, the controller 40 may be configured to direct the energy source 20 to apply a first frequency and a second frequency for a first predetermined period of time in the ultrasonicator 10. For example, the controller 40 may direct the energy source 20 to apply a first frequency of 50 GHz and a second frequency of 10 Hz for twenty seconds. Other examples of the application of simultaneous frequencies for various given times are also possible.

Figure 2:
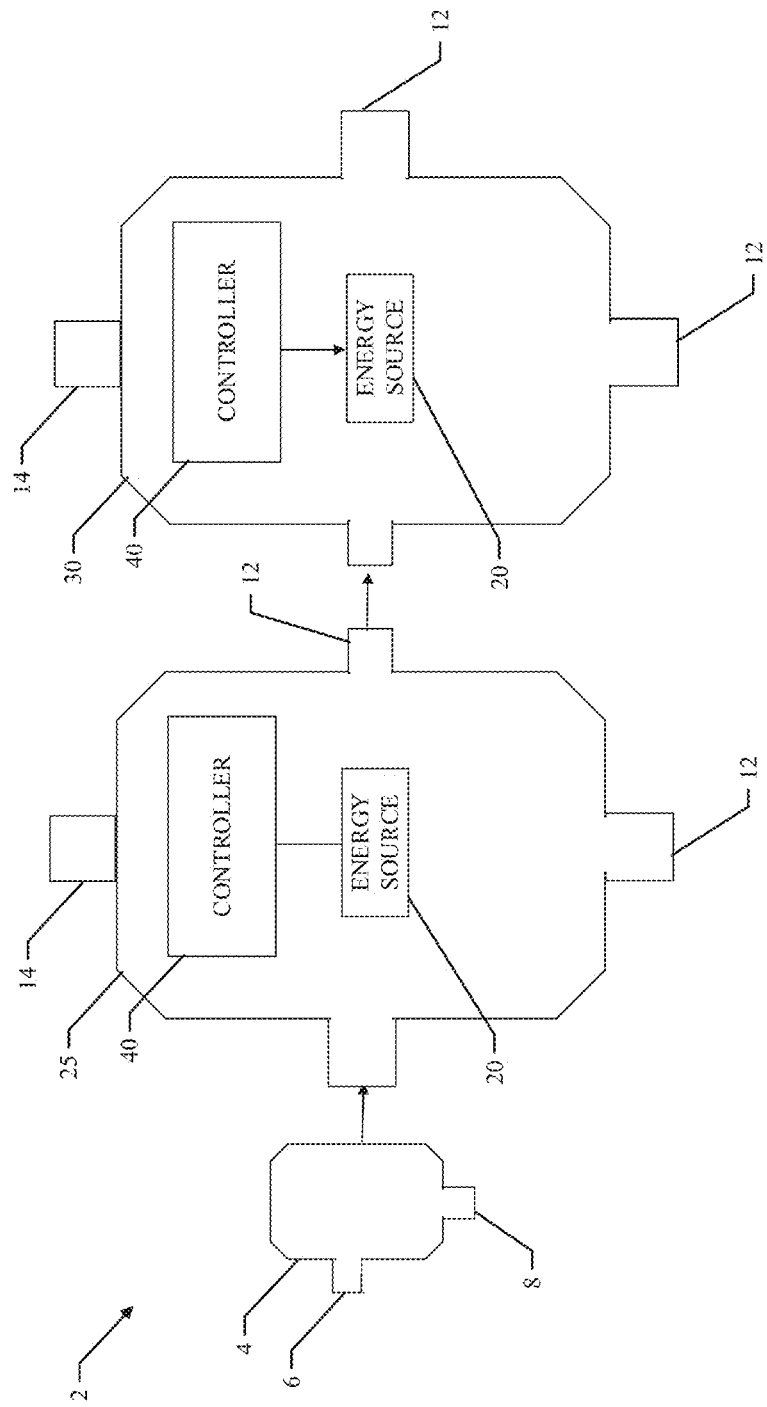
FIG. 2 illustrates a pre-impregnated fiber recycling system according to a further example embodiment.

FIG. 2 illustrates another example embodiment of the pre-impregnated fiber recycling system 2. As shown in FIG. 2, the pre-impregnated fiber recycling system 2 may include a first ultrasonicator 25 and a second ultrasonicator 30, where the first and second ultrasonicators 25, 30 each have an instance of the energy source 20. It should be understood that the first and second ultrasonicators 25, 30 are examples of the ultrasonicator 10.

When the pre-impregnated fiber recycling system 2 includes the first and second ultrasonicators 25, 30, the first and second ultrasonicators 25, 30 may also each have an instance of the controller 40. In one example embodiment, the controller 40 of each of the first and second ultrasonicator 25, 30 may execute a single frequency program. In some cases, the controller 40 of the first ultrasonicator 25 may execute a single frequency program, where the first frequency is a low frequency (e.g., 50 Hz), and the controller 40 of the second ultrasonicator 30 may execute a single frequency program, where the second frequency is a high frequency (e.g., 50 GHz). Accordingly, each of the first and second ultrasonicators 25, 30 may have specific environments under which they operate. In other words, the first ultrasonicator 25 may operate only under low frequency conditions, and the second ultrasonicator 30 may operate only under high frequency conditions, or vice versa. This is in contrast to when the pre-impregnated fiber recycling system 2 only includes one instance of the ultrasonicator 10. When only one instance of the ultrasonicator 10 is included in the system, the ultrasonicator 10 may be configured to operate in a variety of different environments (e.g., high and low frequency).

Figure 3:
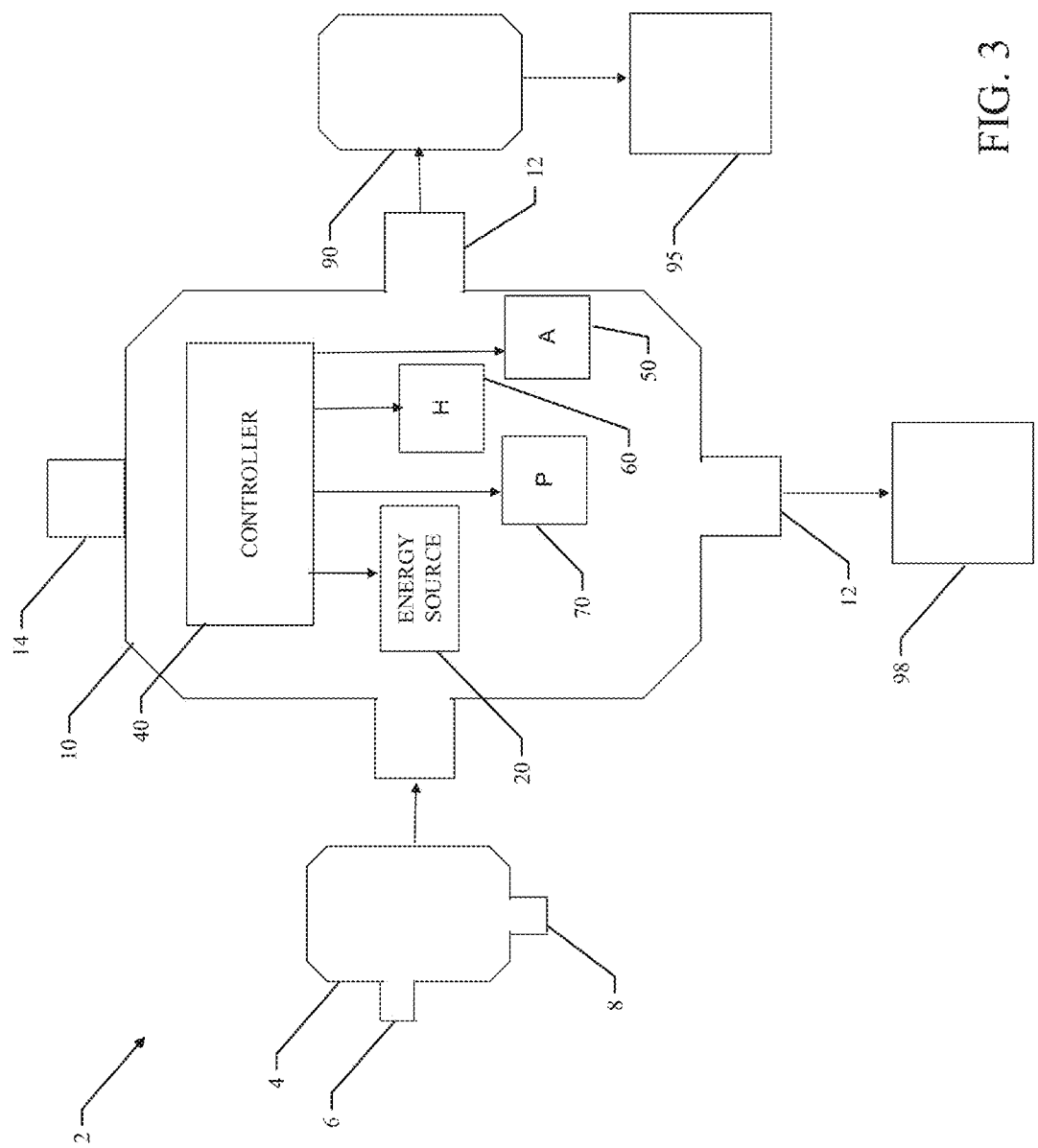
FIG. 3 illustrates a pre-impregnated fiber recycling system according to an example embodiment.

FIG. 3 illustrates another example embodiment of the pre-impregnated fiber recycling system 2. As shown in FIG. 3, in addition to the energy source 20, the ultrasonicator 10 may also include an agitation element (A) 50, a heating element (H) 60, and a pressure element (P) 70. It should be understood, that in other example embodiments, the ultrasonicator 10 may include only one of the agitation element 50, the heating element 60, the pressure element 70, or any combinations thereof. The agitation element 50 may be configured to apply a predetermined amount of mechanical agitation to the solvent-fiber mixture contained within the ultrasonicator 10. The heating element 60 may be configured to apply a predetermined amount of heat to the solvent-fiber mixture contained within the ultrasonicator 10, and the pressure element 70 may be configured to apply a predetermined amount of pressure to the solvent-fiber mixture. The agitation, heating, and pressure elements 50, 60, 70 may assist in expediting the resin removal process and may also be controlled, either directly or indirectly, via the controller 40.

Accordingly, the controller 40 may be configured to execute various programs that factor in not only a frequency to be applied by the energy source 20 but other environmental parameters (e.g., mechanical agitation, temperature, or pressure) in order to ensure that substantially all the resin is effectively removed from the fibers. Accordingly, the controller 40 may execute not only the single frequency, the multiple frequency, or the simultaneous frequency programs, but, for example, a frequency-pressure program, a frequency-temperature program, a frequency-agitation program, or a hybrid program.

In the frequency-pressure program, the controller 40 may be configured to direct the energy source 20 to apply a first frequency and the pressure element 70 to apply a first pressure for a first predetermined period of time. In the frequency-temperature program, the controller 40 may be configured to direct the energy source 20 to apply a first frequency and the heating element 60 to apply a first temperature for a first predetermined period of time. In the frequency-agitation program, the controller 40 may be configured to direct the energy source 20 to apply a first frequency and the agitation element 50 to apply a first mechanical agitation speed for a first predetermined period of time in order to facilitate resin removal from the fibers.

In the hybrid program, the controller 40 may be configured to direct the energy source 20 to apply the first frequency, the pressure element 70 to apply the first pressure, the heating element 60 to apply the first temperature, and the agitation element 50 to apply the first agitation speed for a first predetermined period of time. Of course, the controller 40 may be configured to execute a variety of other programs that may include directing the energy source 20 to apply the first frequency, the pressure element 70 to apply the first pressure, and the heating element 60 to apply the first temperature for the first predetermined period of time. In other cases, the controller 40 may be configured to direct the energy source 20 to apply the first frequency, the heating element 60 to apply the first temperature, and the agitation element 50 to apply the first agitation speed for the first predetermined period of time. Even further, in some example embodiments, the controller 40 may execute programs that include directing the application of the first and second frequencies for a first and second predetermined period of time, respectively, in combination with a predetermined amount of agitation, pressure, or heat, for a third predetermined amount of time. Thus, it should be understood that the controller 40 may execute a variety of programs that include directing the application of the first and/or second frequency in combination with a predetermined amount of agitation, pressure, or heat for predetermined time intervals.

As shown in FIG. 3, once the sonication process has been completed by the ultrasonicator 10, or in other words, once the controller 40 has finished executing a desired program, the cleaned fibers may be transferred to a second container 90 and the cleaned fibers may be washed with water and dried using pressured air, heat, or a combination thereof. Prior to transferring the cleaned fibers to the second container 90, however, excess solvent may be squeezed from the cleaned fibers and the excess solvent may be returned to the ultrasonicator 10. The washed and dried cleaned fibers may then be transferred to a cutting apparatus 95 for chopping or cutting the cleaned fibers into various lengths varying between 0.1 inches to five inches. The chopped fibers can then be used in extrusions with thermoplastic resins, can be compression molded in to different parts, can be used for injection molding purposes, can be used for hot pressing purposes, or the like. In some cases, the chopping and cutting of the cleaned fibers may be done after the resin has been effectively removed from the fibers in order to ensure the cutting apparatus 95 continues to run efficiently without excessive maintenance. In other words, if the fibers are cut while still pre-impregnated with resins, the fibers may stick to the blades of the cutting apparatus 95 making it more difficult to maintain an efficient and effective cutting apparatus 95.

Once the sonication process is completed, the solvent contained in the ultrasonicator 10 may be saturated with the resins. Accordingly, after the fibers have been removed from the ultrasonicator 10 (or in some cases, before the fibers have been removed), the solvent-resin mixture may be transferred via an outlet 12 of the ultrasonicator 10 to a collection container 98. The solvent of the solvent-resin mixture may then be recovered for future reuse. The solvent recovery may be done by a vacuum distillation process or rotary evaporators. In some example embodiments, it should be understood that FIGS. 1 and 2 may also include instances of the second container 90, the cutting apparatus 95, or the collection container 98.

In the vacuum distillation process, the solvent-resin mixture contained in the collection container 98 may be heated to a temperature ranging from 20-250° C. In certain example embodiments, vacuum conditions to effect separation of the solvent from the resins are approximately 1-25 inHg and pressure conditions are 1 kPa to 500 MPa. Under these conditions, the recovery rate of the solvent is approximately 100% and the nuclear magnetic resonance spectroscopy results show that solvent is substantially free of resin. During the vacuum distillation process, the liquid solvent is heated into a vapor and channeled into a condenser where the solvent vapors are condensed to a liquid state. Once substantially all of the solvent vapors are heated into a vapor, only substantially resin is left in the collection container 98.

In some example embodiments, once the resins and the solvent have been separated, the resins may be used in biodiesel product. In order to determine the amount of catalyst and alcohol needed to convert the resins into biodiesel, a titration process may be used. In particular, the titration process may involve preparing a titration solution of a predetermined amount of potassium hydroxide and a predetermined amount of deionized (DI) water. Next, 1 ml of resin may be placed in a beaker, and 10 ml of isopropyl alcohol may be added to the resin in the beaker. While stirring the resulting resin-alcohol mixture, approximately 2-3 drops of phenolphthalein may be added to the resin-alcohol mixture and then the mixture may be mixed for approximately 2-3 minutes. The titration solution may then be added dropwise to the resin-alcohol-phenolphthalein mixture until the resin-alcohol-phenolphthalein mixture changes from a light yellow to a substantially pink color. This titration process may be repeated a predetermined number of times and an average amount of titration solution needed to change the mixture from a light yellow to a substantially pink color may be determined. Accordingly, the amount of alcohol and catalyst needed to convert the resin into biodiesel (or glycerin) may be determined.

Figure 4:
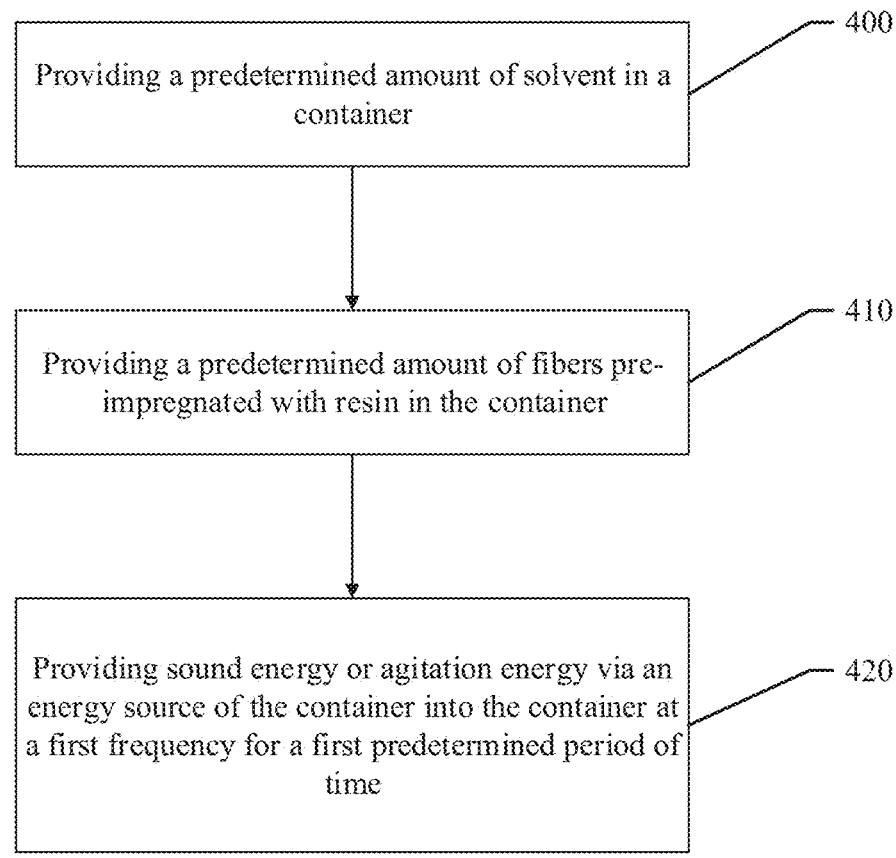
FIG. 4 illustrates a control flow diagram of a method of separating fibers from resin via a single frequency program according to an example embodiment.

FIG. 4 illustrates a control flow diagram of a method of separating the fibers from the resin via a single frequency program. As shown in FIG. 4, the method may include providing the predetermined amount of solvent in the container, at operation 400. At operation 410, the predetermined amount of fibers pre-impregnated with resin may be provided in the container. At operation 420, sound energy or agitation energy may be provided via the energy source into the container at the first frequency for the first predetermined period of time.

Figure 5:
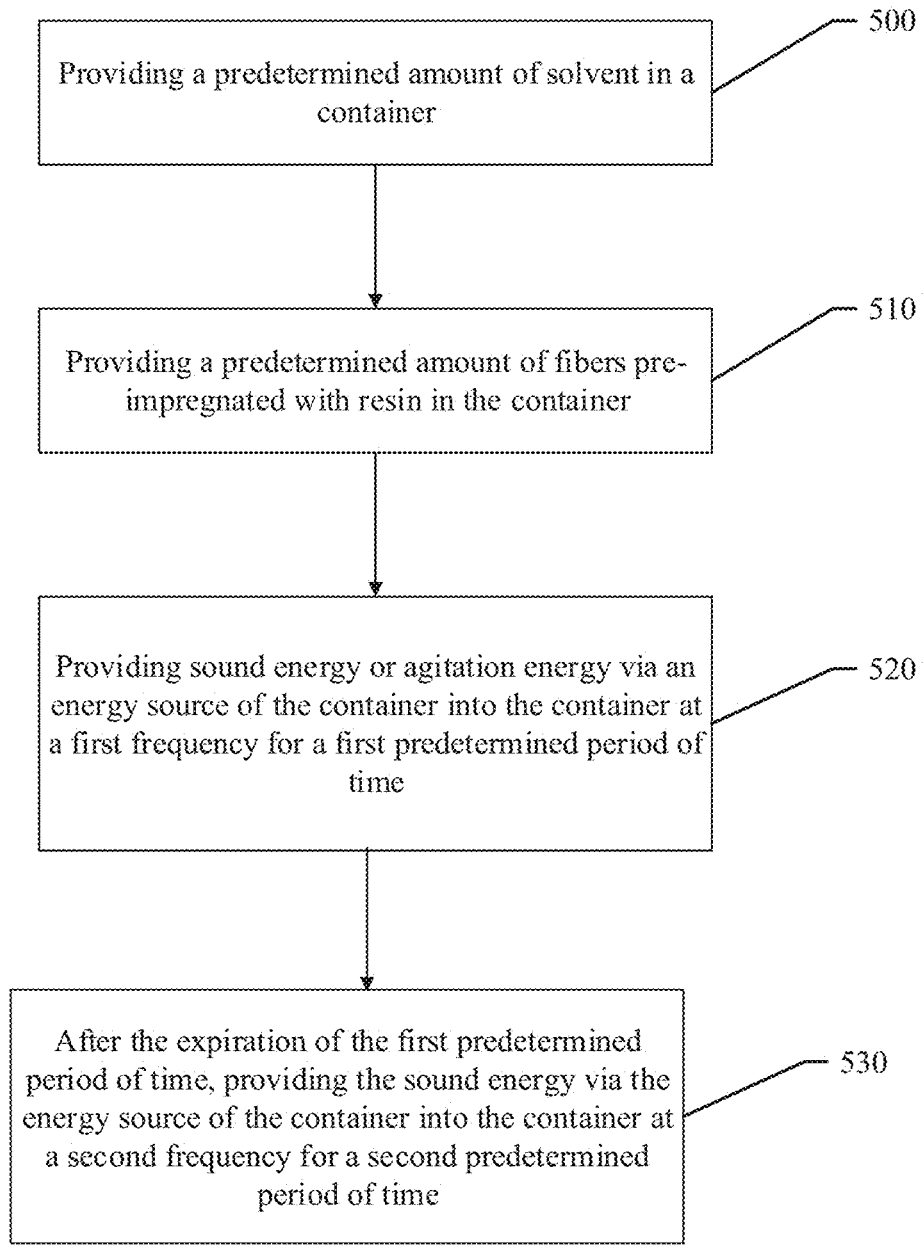
FIG. 5 illustrates a control flow diagram of a method of separating fibers from resin via a multiple frequency program according to an example embodiment.

FIG. 5 illustrates a control flow diagram of a method of separating the fibers from the resin via the multiple frequency program. As shown in FIG. 5, the method may include providing the predetermined amount of solvent in the container, at operation 500. At operation 510, the predetermined amount of fibers pre-impregnated with resin may be provided in the container. At operation 520, sound energy or agitation energy may be provided via the energy source into the container at the first frequency for the first predetermined period of time. Then, at operation 530, after the expiration of the first predetermined period of time, the sound energy may be provided via the energy source of the container into the container at the second frequency for the second predetermined period of time.

Figure 6:
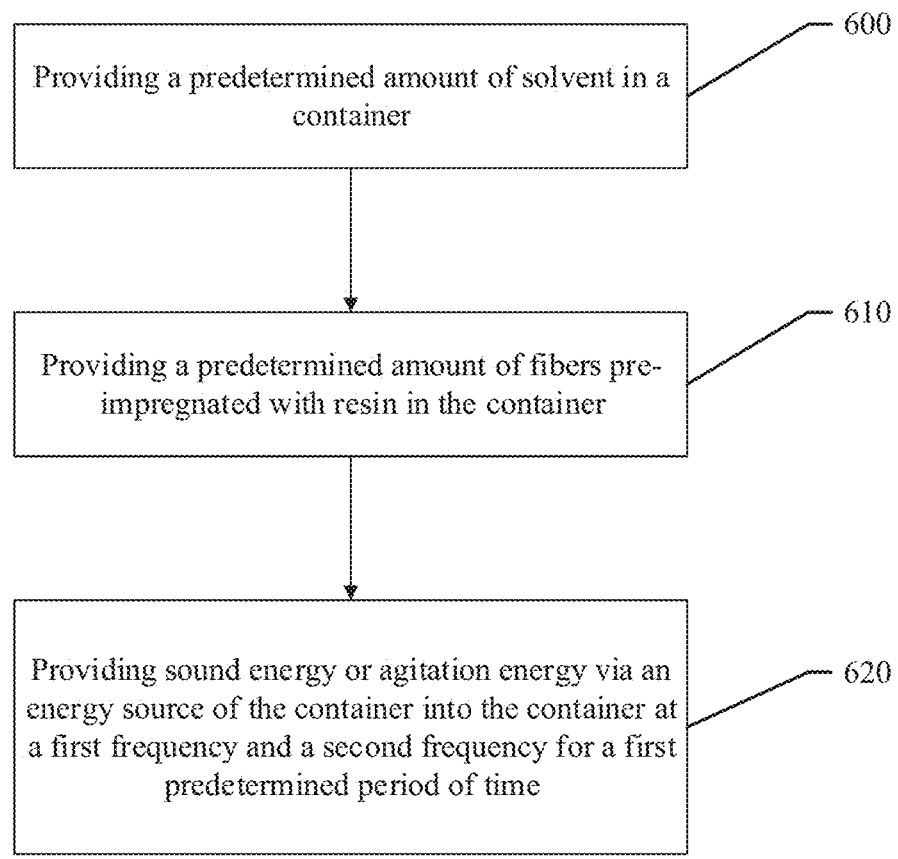
FIG. 6 illustrates a control flow diagram of a method of separating fibers from resin via a simultaneous frequency program according to an example embodiment.

FIG. 6 illustrates a control flow diagram of a method of separating the fibers from the resin via the simultaneous frequency program. As shown in FIG. 6, the method may include providing the predetermined amount of solvent in the container, at operation 600. At operation 610, the predetermined amount of fibers pre-impregnated with resin may be provided in the container. At operation 620, sound energy or agitation energy may be provided via the energy source into the container at the first frequency and the second frequency for the first predetermined period of time.

Figure 7:
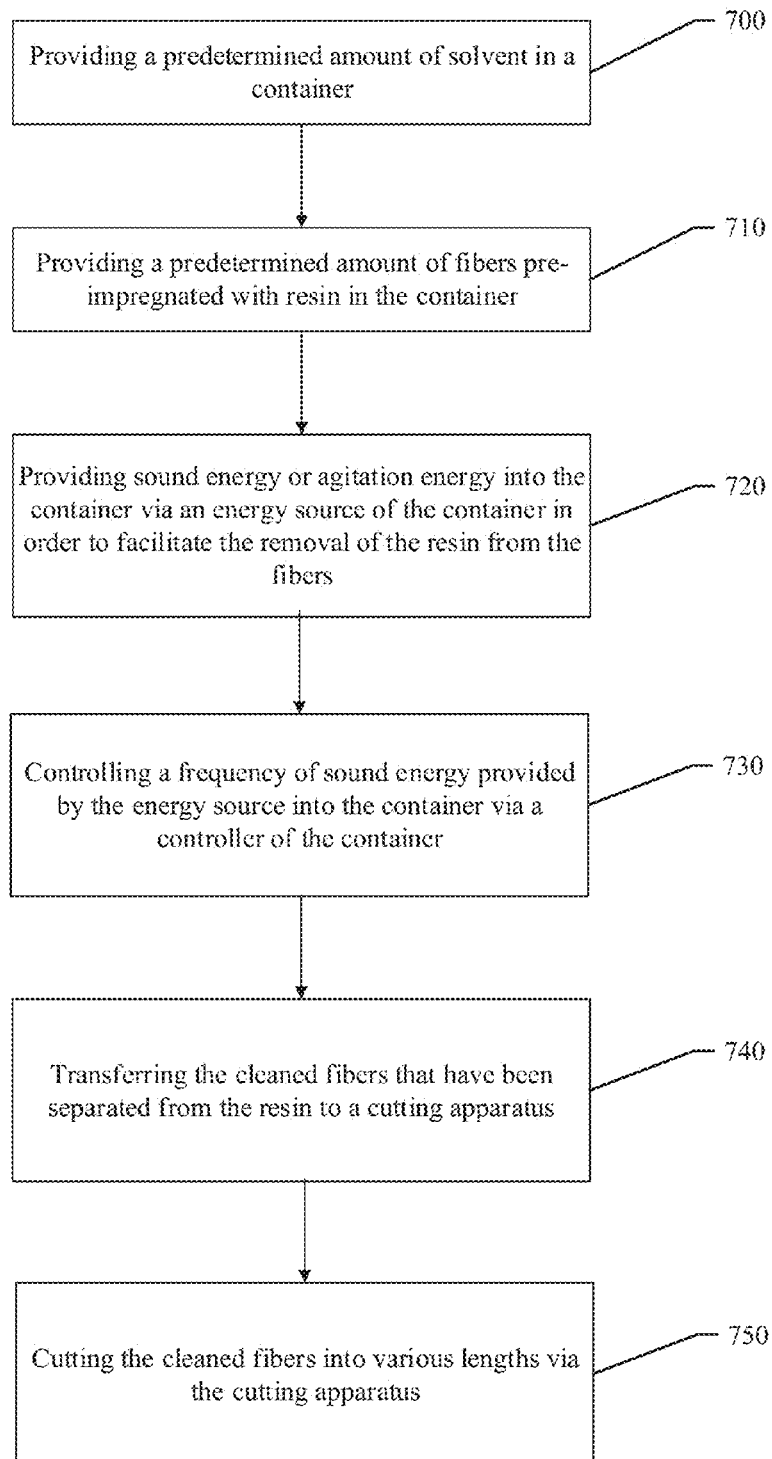
FIG. 7 illustrates a control flow diagram of a method of recycling pre-impregnated fibers via a single frequency program according to an example embodiment.

FIG. 7 illustrates a control flow diagram of a method of recycling the pre-impregnated fibers using the single frequency program. As shown in FIG. 7, the method may include providing the predetermined amount of solvent in the container, at operation 700. At operation 710, the predetermined amount of fibers pre-impregnated with resin may be provided in the container. At operation 720, sound energy or agitation energy may be provided into the container via the energy source of the container in order to facilitate the removal of the resin from the fibers. Then, at operation 730, the frequency of the sound energy provided by the energy source into the container may be controlled via a controller of the container. At operation 740, the cleaned fibers that have been separated from the resin, after the end of the sonication process, may be transferred to the cutting apparatus. Then, at operation 750, the cleaned fibers may be cut via the cutting apparatus into various lengths.

Example embodiments may therefore enable the recycling of fibers pre-impregnated with resin. Accordingly, an apparatus for recycling of fibers pre-impregnated with resin may include a container configured to receive a predetermined amount of solvent and a predetermined amount of fibers pre-impregnated with resin. The apparatus may also include an energy source configured to provide sound energy into the container in order to facilitate the removal of resin from the fibers, and a controller configured to control a frequency of the sound energy provided by the energy source into the container. The system may include various modifications, additions or augmentations that may optionally be applied. Thus, for example, in some cases, the controller may be configured to execute a program, in order to control the frequency of the sound energy provided by the energy source into the container. Alternatively or additionally, the program may be one of a single frequency program, a multiple frequency program, or a simultaneous frequency program. In some cases, the single frequency program may include directing the application of a first frequency of the sound energy for a first predetermined period of time. In some cases, the multiple frequency program may include directing the application of a first frequency of the sound energy for a first predetermined period of time, and after the expiration of the first predetermined period of time, directing the application of a second frequency of the sound energy for a second predetermined period of time, wherein the first frequency and the second frequency are different. In further example embodiments, the container may further include one of a pressure element configured to provide pressure into the container, a heating element configured to provide heat into the container, or an agitation element configured to provide mechanical agitation into the container. Alternatively or additionally, the controller may be configured to execute a program, in order to control the frequency of the sound energy provided by the energy source into the container and one of pressure, heat, or agitation provided by the pressure element, the heating element, or the agitation element, respectively, into the container. Alternatively or additionally, the program may be one of a frequency-pressure program, a frequency-heat program, or a frequency-agitation program. In some example embodiments, the container may further include an outlet to transfer cleaned fibers to a cutting apparatus configured to cut the cleaned fibers into a predetermined length. In some example embodiments, the container may further include an outlet to transfer a solvent-resin mixture to a collection container.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of recycling fibers pre-impregnated with resin, the method comprising:
   providing fibers pre-impregnated with resin in a container;
   providing a solvent in the container to make a solvent-fiber mixture, the solvent being selected based on type information associated with the resin;
   providing sound energy into the container via an energy source of the container, the energy source providing the sound energy directly to the solvent-fiber mixture in the container in order to facilitate the removal of the resin from the fibers to create separated fibers with substantially no resin and a solvent-resin mixture; and
   controlling a frequency of the sound energy provided by the energy source into the container via a controller of the container;
   wherein the controller is configured to access data tables used to drive the energy source, the data tables defining a specific time interval, sequence and frequency for specific fibers, resins, or fiber/resin combinations.

2. The method of claim 1, wherein the method further comprises executing a program via the controller in order to control the frequency of the sound energy provided by the energy source into the container.

3. The method of claim 2, wherein the program is one of a single frequency program, a multiple frequency program, or a simultaneous frequency program.

4. The method of claim 3, wherein the single frequency program comprises:
   directing the application of a first frequency of the sound energy for a first predetermined period of time.

5. The method of claim 3, wherein the multiple frequency program comprises:
   directing the application of a first frequency of the sound energy for a first predetermined period of time; and
   after the expiration of the first predetermined period of time, directing the application of a second frequency of the sound energy for a second predetermined period of time, wherein the first frequency and the second frequency are different.

6. The method of claim 1, wherein the method further comprises providing pressure into the container via a pressure element, providing heat into the container via a heating element, or providing mechanical agitation into the container via an agitation element.

7. The method of claim 6, wherein the method further comprises executing a program via the controller in order to control the frequency of the sound energy provided by the energy source into the container and one of pressure, heat, or agitation provided by the pressure element, the heating element, or the agitation element, respectively, into the container.

8. The method of claim 7, wherein the program is one of a frequency-pressure program, a frequency-heat program, or a frequency-agitation program.

9. The method of claim 1, wherein the method further comprises transferring cleaned fibers to a cutting apparatus and cutting the cleaned fibers to a predetermined length via a cutting apparatus.

10. The method of claim 1, wherein the method further comprises transferring the solvent-resin mixture into a collection container.

11. The method of claim 10, further comprising recycling the resin from the solvent-resin mixture in the collection container via vacuum distillation.

12. The method of claim 10, further comprising recycling the resin from the solvent-resin mixture in the collection container via rotary evaporators.

13. The method of claim 1, further comprising transferring the solvent-fiber mixture into a second container in which a second energy source applies a second frequency, wherein the second frequency applied in the second container is different than the frequency applied in the container.

14. The method of claim 13, wherein the second frequency applied in the second container is higher than the frequency applied in the container.

15. The method of claim 13, wherein the second frequency applied in the second container is lower than the frequency applied in the container.

* * * * *